J. STOLZ.
HEADER AND HEADER BINDER.
APPLICATION FILED OCT. 29, 1912.
1,093,742.
Patented Apr. 21, 1914.
3 SHEETS—SHEET 1.
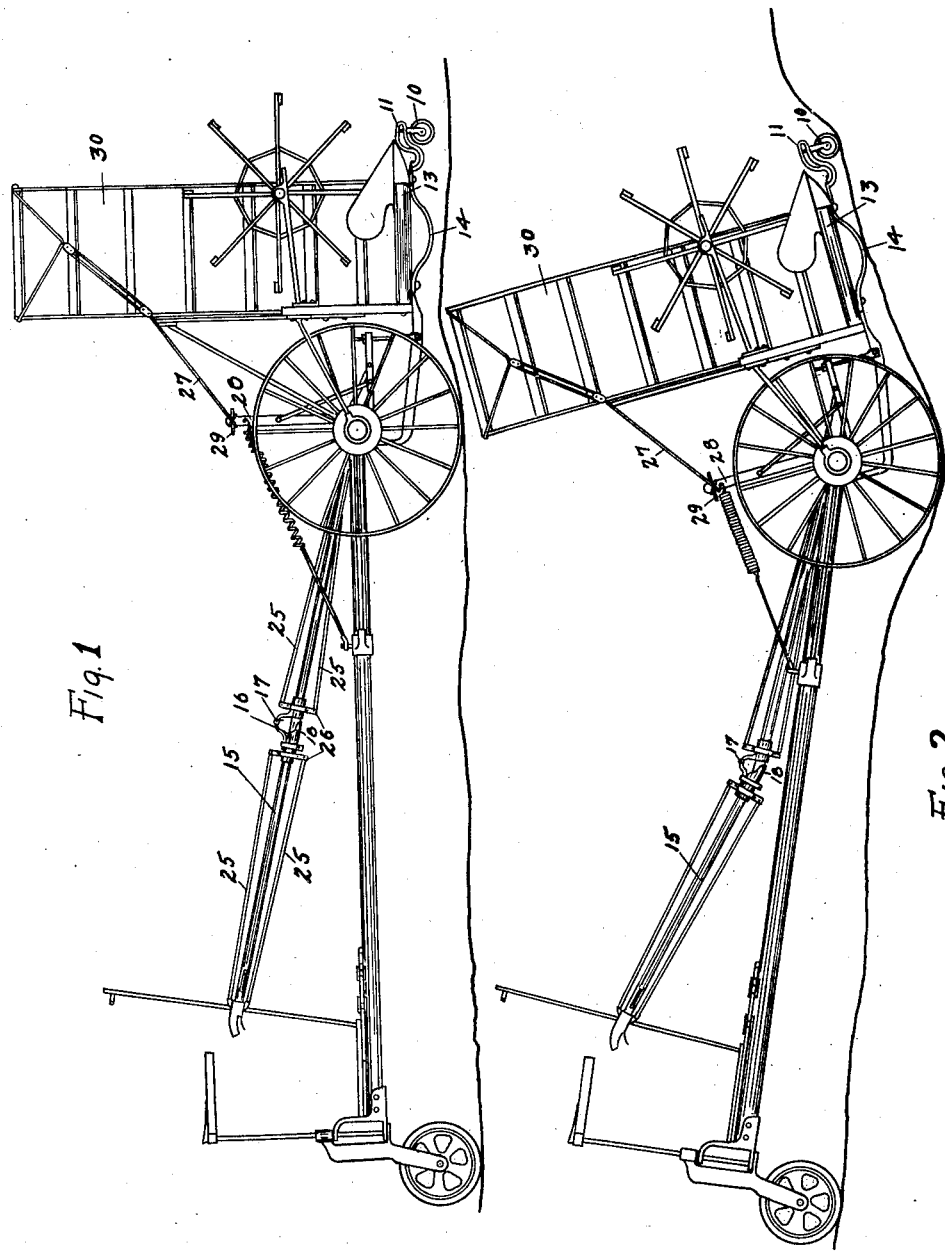

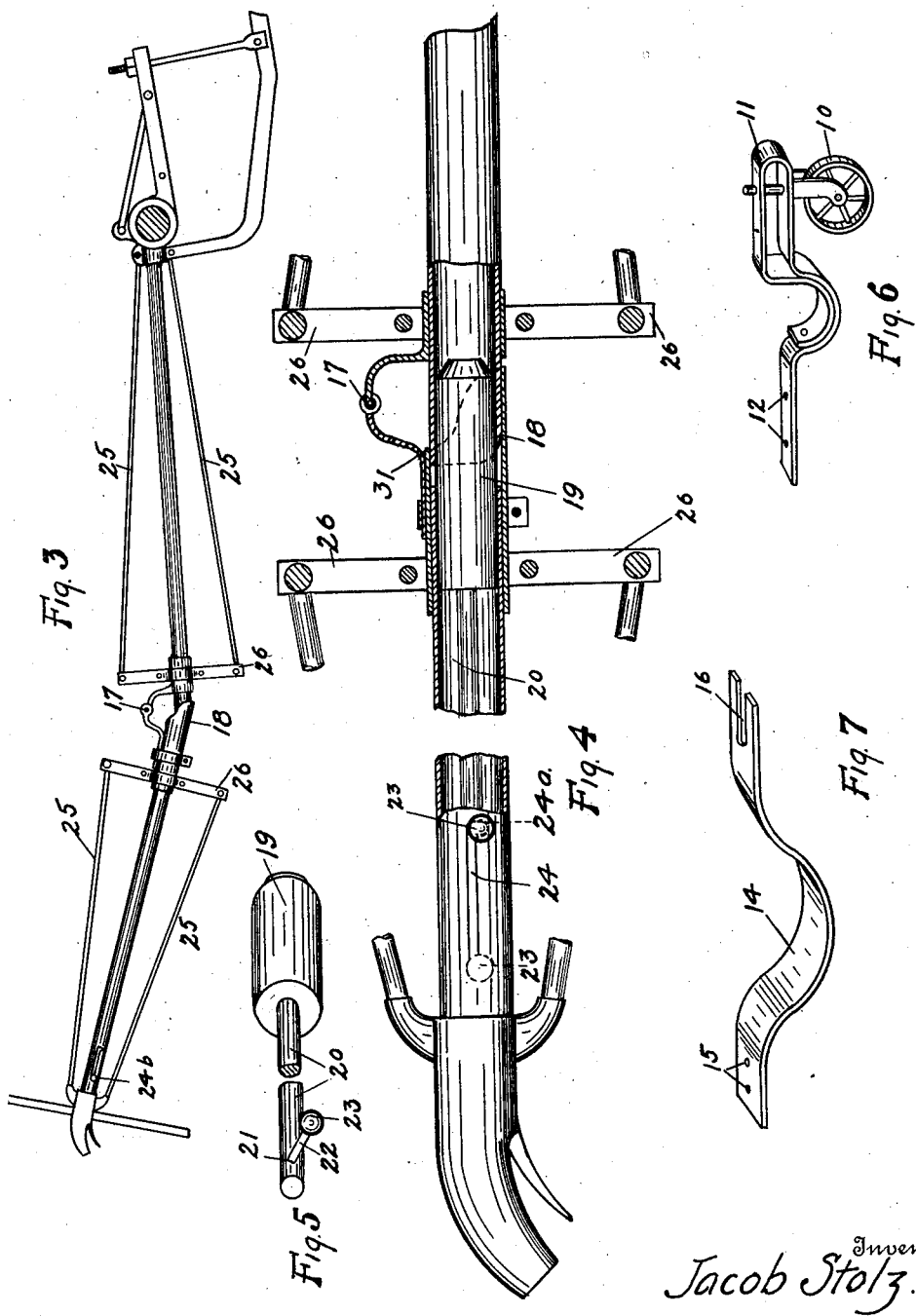

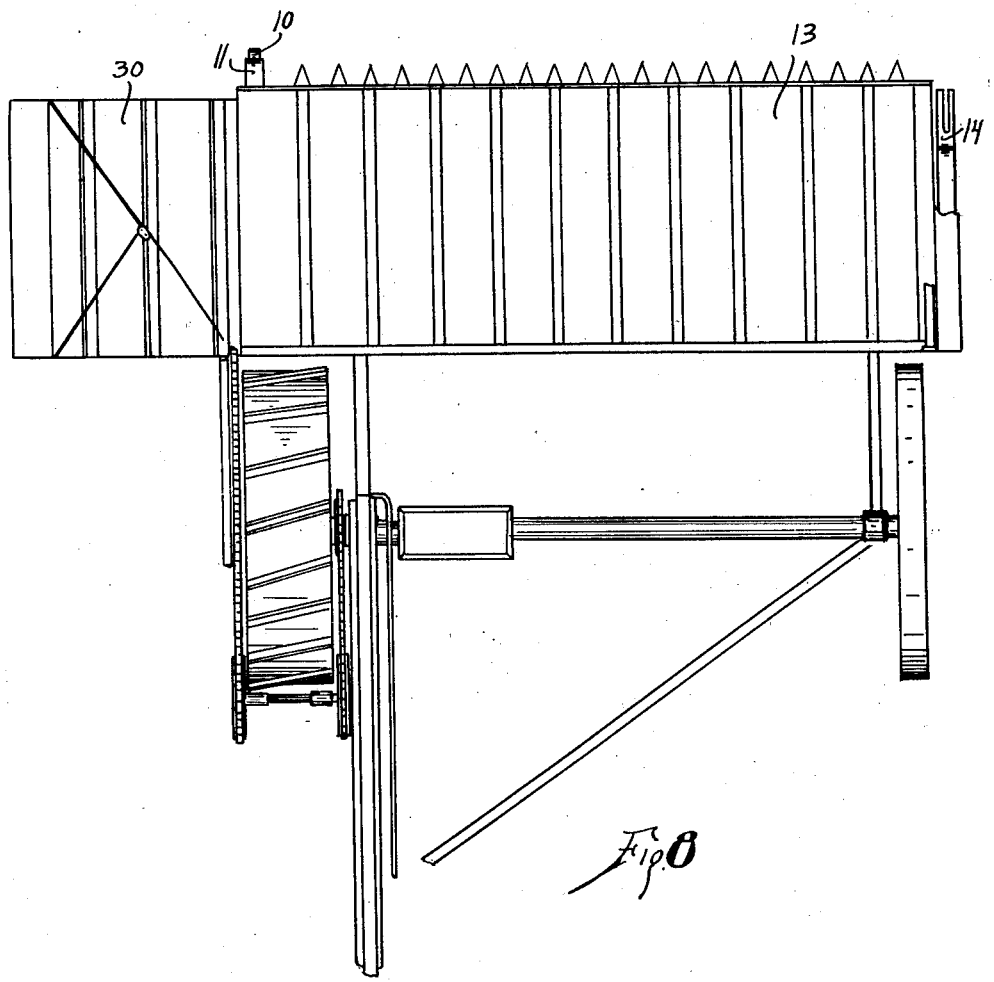

UNITED STATES PATENT OFFICE.

JACOB STOLZ, OF WARDEN, WASHINGTON.

HEADER AND HEADER-BINDER.

1,093,742.  Specification of Letters Patent.  Patented Apr. 21, 1914.

Application filed October 29, 1912. Serial No. 728,369.

*To all whom it may concern:*

Be it known that I, JACOB STOLZ, a citizen of the United States, residing at Warden, in the county of Grant and State of Washington, have invented certain new and useful Improvements in Headers and Header-Binders, of which the following is a specification.

This invention relates to devices for making possible the passage of headers or header binders over coulées and ditches, and has for its objects the means of preventing the sickle or other parts of the platform from thrusting itself into the ground during the passage over the coulée or ditch.

A further object is to provide a tilting lever that will hinge and not change its relation with respect to its connecting parts during such passage.

A still further object is to provide a hinged tilting lever that may be locked to keep it rigid, and released to hinge when a crossing is to be effected.

With these and other objects in view, the invention consists in the novel construction hereinafter described and claimed.

Briefly described, the invention includes a caster wheel mounted directly under the pitman box of the header, and engaging the ground to keep the header sickle or platform from contact with the opposite bank of the coulée or ditch, and a spring runner mounted at the extreme right end of the header platform and provided for the same purpose; a tilting lever hinged at a point near its center and capable of being held rigid or free to break when the caster wheel has engaged the ground or bank of the ditch and has raised the platform to prevent its entering the ground and stopping progress.

In the accompanying drawings, forming a part of this application:—Figure 1 is a side view in elevation of a header in normal position. Fig. 2 is the same as Fig. 1, but showing the header in position assumed when crossing a ditch and about to mount the opposite side. Fig. 3 is a side elevation of the tilting lever in broken position. Fig. 4 is a detail of a part of the tilting lever partly in section. Fig. 5 is a detail in perspective of the locking means or bolt for the tilting lever. Fig. 6 is a perspective view of the caster wheel mounting for attachment to the header. Fig. 7 is a perspective view of the spring runner for engaging the ground at the extreme right end of the header platform. Fig. 8 is a plan view of the header.

Similar characters refer to similar parts throughout the views.

In carrying out my device, I mount a caster wheel 10, upon a frame 11, provided with means 12, for attachment to the header platform at a point directly under the pitman box. This leaves the caster wheel slightly forward of the sickle, but not engaging the ground except when crossing a coulée or ditch. The caster 10, is provided to raise the header platform 13, whenever it touches the ground; a spring 14, is also provided for the same purpose and is located on the header platform 13, at the extreme right end, and is attached to said platform by screws or bolts through holes 15. On the opposite end of 14 is provided a slot 16, which engages with one of the bolts of the header platform, and if engagement of the runner with the ground is too sudden, the spring will give sufficiently to cause a slight movement in this slotted connection 16, to absorb the shock. As the caster wheel 10, is so mounted in front of the header frame, it will be the first part of the machine to engage with the ground in making the crossing of a ditch, and will always serve to keep the parts of the header from contact that would stop the progress of the machine or injure said machine.

To make it possible for a header to cross a coulée or ditch, and at the same time keep all of the several parts of the machine in working adjustment, I hinge the tilting lever 15, and provide an extended hinge 17, rigidly attached to the portions of the tilting lever 15. A scoop shaped member 18, securely fastened to the forward end of the rear section of 15, is provided to receive the rear end of the forward section of 15, and is constructed slightly larger than the end so that a snug fit is made when 15 is in a straight line, the purpose being to stiffen the tilting lever and eliminate the side strain on the hinge 17. The lower portion of the outer end of 18 is scoop shaped to provide for the forward section being received within its confines and properly positioned to receive the bolt 19 which causes the lever 15 to be held rigid. The bolt 19, is attached to a stem 20, extending rearwardly to a point near the handle of the tilting lever 15. At 21, is provided a stem 22, supporting a ball 23, which engages in a slot 24, to hold the bolt 19, in engagement with the forward end of the tilting lever.

25, are truss rods provided to stiffen the lever and are provided to be attached to lever 15 at ends and to stay members 26 near the hinges.

It is usual in headers to tie the rope 27, that supports the header elevator 30, to a cleat near the handle of the tilting lever. To accomplish my purpose, I change the mode of supporting this rope and provide an extension of the spring post 28, with a cross member 29, for a cleat around which the rope 27 may be secured.

Under normal conditions, when heading grain, the header is in the position shown in Fig. 1 of the drawing. The lever is locked by means of the bolt 19, to be rigid and to operate to raise or lower the header platform to meet the conditions of that particular grain field. The stem 22, attached to the bolt rod 20, is holding the bolt in a locked position by engaging in the slot 24$^a$. As the machine comes to a ditch the stem 22 is lifted out of engagement with 24$^a$, drawn through slot 24, to a position 24$^b$, which effects the withdrawal of the bolt 19, and as the machine enters the ditch and is about to mount the opposite bank, the caster 10, engaging the bank will cause the header platform to raise and the tilting lever 15 will hinge and assume a position shown in Fig. 2. When the machine again reaches level ground the bolt may be again thrust into engagement with the forward end of the tilting lever and hold it rigidly until it is again desired to cross a coulée or ditch.

Changes in detail may be made without departing from the spirit or scope of my invention, but

I claim:

1. In an improved header of the character described, a combination of a header platform, a caster wheel and a supporting member for attachment to the header platform, a spring runner for engaging with the ground and attached to said header platform at its extreme right end, a tilting lever hinged intermediate its ends and provided to be held rigid by means of a scoop shaped member and a bolt engaging the tilting lever.

2. In an improved header of the character described, a combination of a header platform, a caster wheel and a spring runner both mounted on and beneath said platform and both in position to engage with the ground to raise the header platform; a tilting lever attached to the header platform and broken intermediate its ends and hinged to allow the raising of a header platform when said caster wheel and spring runner engage the ground, a means for holding the tilting lever rigid and means for holding one end of the broken tilted lever to the other to prevent lateral movement and to relieve the hinge.

3. In an improved header of the character described, a combination with a header platform of a caster wheel and a spring runner both mounted on and beneath said platform, of a tilting lever hinged intermediate its ends to allow for the raising of the platform, a scoop shaped member provided to limit the movement in one direction of the hinged parts in a normal position and a means for locking the hinged parts rigid.

4. In an improved header of the character described, a combination of a header platform, the caster wheel and a spring runner both mounted on and beneath said platform, of a hollow tilting lever hinged intermediate its ends and provided with means to lock and hold it rigid, said means comprising a bolt slidably mounted in one portion of the tilting lever and extending into the other portion of the tilting lever; means for unlocking and allowing said tilting lever to break, comprising means for withdrawing said bolt from second mentioned portion of the tilting lever, said last mentioned means comprising an extension of said bolt positioned within reach of the operator.

In testimony whereof I affix my signature in presence of two witnesses.

JACOB STOLZ.

Witnesses:
 ED. G. BOWKER,
 A. J. SMITH.

---

Copies of this patent may be obtained for five cents each, by addressing the "Commissioner of Patents, Washington, D. C."